(12) United States Patent
Mastrolia

(10) Patent No.: US 11,319,078 B2
(45) Date of Patent: May 3, 2022

(54) HYDRAULIC THRUST VECTOR PITCH CONTROL NOZZLE FOR ROCKET CATAPULT

(71) Applicant: AMI Industries, Inc., Colorado Springs, CO (US)

(72) Inventor: Bradley Mastrolia, Colorado Springs, CO (US)

(73) Assignee: AMI Industries, INC., Colorado Springs, CO (US)

( * ) Notice: Subject to any disclaimer, the term of this patent is extended or adjusted under 35 U.S.C. 154(b) by 109 days.

(21) Appl. No.: 16/871,478

(22) Filed: May 11, 2020

(65) Prior Publication Data

US 2021/0009275 A1 Jan. 14, 2021

Related U.S. Application Data

(60) Provisional application No. 62/873,628, filed on Jul. 12, 2019.

(51) Int. Cl.
*B64D 25/10* (2006.01)

(52) U.S. Cl.
CPC .................. *B64D 25/10* (2013.01)

(58) Field of Classification Search
CPC .................. B64D 25/10; F02K 9/84
See application file for complete search history.

(56) References Cited

U.S. PATENT DOCUMENTS

| 3,979,088 | A | | 9/1976 | McCormick | |
|---|---|---|---|---|---|
| 4,236,687 | A | * | 12/1980 | Stone | B64D 25/10 244/122 AD |
| 4,667,903 | A | | 5/1987 | Herndone | |
| 7,578,472 | B2 | * | 8/2009 | Mastrolia | B64D 25/10 244/122 A |
| 2009/0072087 | A1 | * | 3/2009 | Mastrolia | B64D 25/10 244/122 A |

* cited by examiner

*Primary Examiner* — Justin M Benedik
(74) *Attorney, Agent, or Firm* — Snell & Wilmer L.L.P.

(57) ABSTRACT

A nozzle assembly for an ejection seat may comprise a servo valve assembly, a reservoir a cylinder, a nozzle manifold housing comprising a monolithic body having internal manifold structures integral to the body configured to communicate a gas between a pressure source and the reservoir, and configured to communicate a hydraulic fluid between, the reservoir, the servo valve assembly, and the cylinder, a rack piston disposed within the cylinder and configured to translate axially therein between a base end and a head end of the cylinder, and a linear nozzle coupled to the rack piston and configured to rotate in response to an axial translation of the rack piston.

20 Claims, 7 Drawing Sheets

HYDRAULIC THRUST VECTOR PITCH CONTROL NOZZLE FOR ROCKET CATAPULT

CROSS REFERENCE TO RELATED APPLICATIONS

This application is a non-provisional application claiming priority to U.S. Provisional Application Ser. No. 62/873,628, which was filed on Jul. 12, 2019 and entitled "HYDRAULIC THRUST VECTOR PITCH CONTROL NOZZLE FOR ROCKET CATAPULT," the entirety of which is incorporated by reference in its entirety for all purposes.

FIELD

The present disclosure relates to escape systems, and more specifically, to ejection seat motor assemblies having thrust vectoring controls.

BACKGROUND

Ejection systems are designed to expel pilots from an aircraft cockpit. Ejection seats in high performance aircraft benefit of safely removing the pilot or other occupant from the stricken aircraft across a wide variety of aircraft speed regimes, altitudes and aircraft attitudes. Generally, the most difficult ejection occurs when the aircraft is at low altitude and at an inverted or other non-upright orientation. Approximately half of aircraft ejection fatalities occur due to insufficient altitude at the time of ejection. Without sufficient altitude, the occupant's recovery parachute cannot fully deploy to bring the occupant safely to the ground. It has long been recognized that an aircraft ejection seat having the capability of assuming an upright orientation irrespective of the aircraft attitude and thereafter gaining sufficient altitude for a safe parachute deployment would is desirable for reducing ejection fatalities.

SUMMARY

In various embodiments, a nozzle assembly comprises a servo valve assembly, a reservoir a cylinder, a nozzle manifold housing comprising a monolithic body having internal manifold structures integral to the body configured to communicate a gas between a pressure source and the reservoir, and configured to communicate a hydraulic fluid between, the reservoir, the servo valve assembly, and the cylinder, a rack piston disposed within the cylinder and configured to translate axially therein between a base end and a head end of the cylinder, and a linear nozzle coupled to the rack piston and configured to rotate in response to an axial translation of the rack piston.

In various embodiments, the internal manifold structures include a gas passage between the pressure source and the reservoir, an upper manifold structure, and a lower manifold structure. In various embodiments, the lower manifold structure is coupled to a first output port of the servo valve assembly and configured to feed the base end of the cylinder, wherein the upper manifold structure is coupled to a second output port of the servo valve assembly and configured to feed the head end of the cylinder. In various embodiments, the cylinder and the reservoir are integral to the nozzle manifold housing. In various embodiments, the cylinder comprises a rack window. In various embodiments, the rack piston comprises a toothed rack disposed in the rack window, wherein the linear nozzle is coupled to the toothed rack at a pinion tooth set. In various embodiments, a gear ratio between the toothed rack and the pinion tooth set is 11:17. In various embodiments, a gear ratio between the toothed rack and the pinion tooth set is 11:17. In various embodiments, the nozzle assembly includes a tangible, non-transitory memory configured to communicate with a controller, the tangible, non-transitory memory having instructions stored thereon that, in response to execution by the controller, cause the controller to perform operations comprising, determining, a current pitch angle, determining a desired pitch angle, and controlling the linear nozzle to a nozzle command angle based on the desired pitch angle.

In various embodiments, an ejection seat comprises a seat pan, a seat back coupled to the seat pan, and a rocket catapult assembly coupled to the seat back including a motor assembly configured to generate a high pressure gas coupled to a nozzle assembly, the nozzle assembly comprising a servo valve assembly, a reservoir, a cylinder, a nozzle manifold housing comprising a monolithic body having internal manifold structures integral to the body configured to communicate the high pressure gas between the motor assembly and the reservoir, and configured to communicate a hydraulic fluid between, the reservoir, the servo valve assembly, and the cylinder, a rack piston disposed within the cylinder and configured to translate axially therein between a base end and a head end of the cylinder, and a linear nozzle coupled to the rack piston and configured to rotate in response to an axial translation of the rack piston.

In various embodiments, the internal manifold structures include a gas passage between the pressure source and the reservoir, an upper manifold structure, and a lower manifold structure. In various embodiments, the lower manifold structure is coupled to a first output port of the servo valve assembly and configured to feed the base end of the cylinder, wherein the upper manifold structure is coupled to a second output port of the servo valve assembly and configured to feed the head end of the cylinder. In various embodiments, the cylinder and the reservoir are integral to the nozzle manifold housing. In various embodiments, the cylinder comprises a rack window. In various embodiments, the rack piston comprises a toothed rack disposed in the rack window, wherein the linear nozzle is coupled to the toothed rack at a pinion tooth set. In various embodiments, a gear ratio between the toothed rack and the pinion tooth set is 11:17. In various embodiments, a gear ratio between the toothed rack and the pinion tooth set is 11:17. In various embodiments, the nozzle assembly includes a tangible, non-transitory memory configured to communicate with a controller, the tangible, non-transitory memory having instructions stored thereon that, in response to execution by the controller, cause the controller to perform operations comprising, determining, a current pitch angle, determining a desired pitch angle, and controlling the linear nozzle to a nozzle command angle based on the desired pitch angle.

In various embodiments, an article of manufacture is disclosed including a tangible, non-transitory computer-readable storage medium having instructions stored thereon that, in response to execution by a processor, cause the processor to perform operations comprising transitioning a rocket catapult assembly from an inactive to an active state, determining a current pitch angle based on a pitch rate signal, determining a desired pitch angle base on a first pressure signal, and controlling a linear nozzle to a nozzle command angle based on the desired pitch angle. In various embodiments, the operations include determining a thrust based on a second pressure signal, calculating, a pitch moment based on a first gain function of the current pitch angle, the desired pitch angle, and a second gain function, wherein the second gain function is based on the pitch rate signal, and calculating the nozzle command angle based on the thrust and the pitch moment.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to tacked, attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Figure 1A:
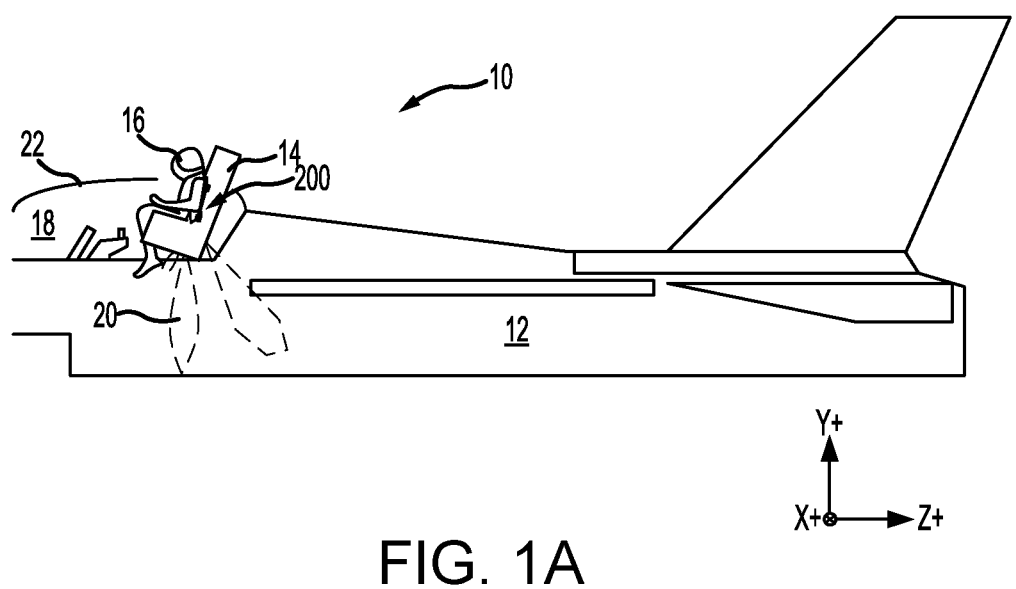
FIG. 1A illustrates an aircraft ejection system, in accordance with various embodiments.

With reference to FIG. 1A, an aircraft ejection system 10 is shown, in accordance with various embodiments. Aircraft ejection system 10 may be installed in aircraft 12 to expel an ejection seat 14 and an occupant 16 of ejection seat 14 from a cockpit 18 of aircraft 12. Ejection seat 14 may be urged from cockpit 18 by a propulsion system 20. In accordance with various embodiments, ejection seat 14 includes rocket catapult assembly 200. Rocket catapult assembly 200 may comprise an element of propulsion system 20 and be configured to extract the ejection seat 14 from cockpit 18.

Figure 1B:
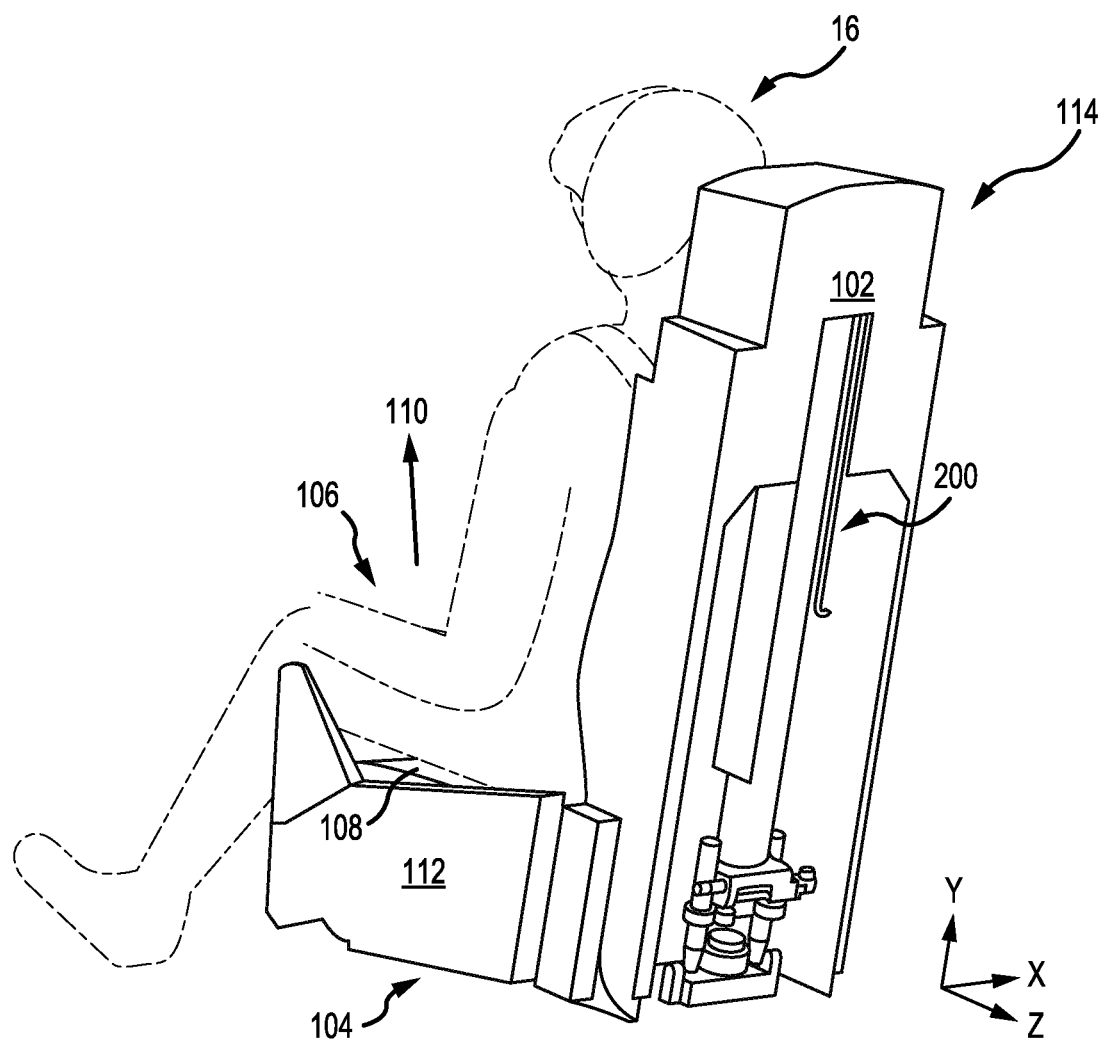
FIG. 1B illustrates an ejection seat having a catapult system in an inactive state, in accordance with various embodiments.

With additional reference to FIG. 1B, ejection seat 14 is illustrated with rocket catapult assembly 200 in an inactive state, in accordance with various embodiments. Ejection seat 14 includes a seat back 102 and a seat pan 104. The rocket catapult assembly 200 is coupled to seat back 102. In various embodiments, an ejection handle 106 may be located proximate a front 108 of seat pan 104. Front 108 of seat pan 104 is generally opposite, or distal, seat back 102. While FIG. 1B shows ejection handle 106 located at front 108 of seat pan 104, it is further contemplated and understood that ejection handle 106 may be located anywhere that is accessible to an occupant of ejection seat 14. For example, ejection handle 106 may be located on a side 112 of seat pan 104 or a headrest 114 of seat back 102.

Figure 2:
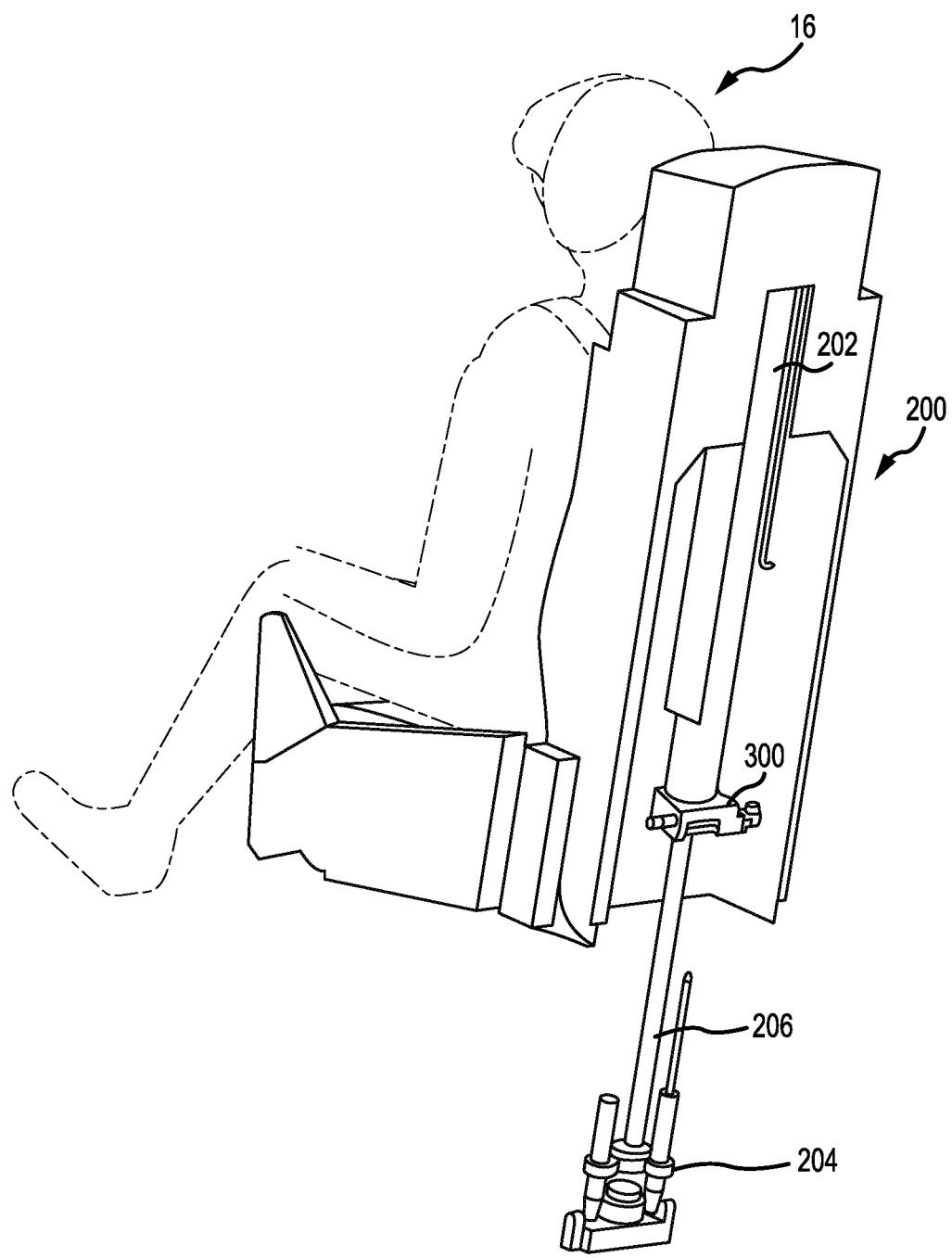
FIG. 2 illustrates an ejection seat having a catapult system in an active state, in accordance with various embodiments.

With additional reference to FIG. 2, ejection seat 14 is illustrated with rocket catapult assembly 200 in an active state, in accordance with various embodiments. Ejection handle 106 may be configured to initiate an ejection sequence upon actuation. For example, occupant 16 pulling ejection handle 106 in the direction of arrow 110 may activate the rocket catapult assembly 200. Rocket catapult assembly 200 may comprise a motor assembly 202, a ram assembly 204, and a nozzle assembly 300. In response to activation, the motor assembly 202 may ignite and tend to produce relatively hot, high pressure gas. Ram assembly 204 may be coupled to the aircraft 12 and comprise a ram 206 disposed within the motor assembly 202. In various embodiments, a first portion of gas may be directed toward the ram 206, tending thereby to drive the ram 206 outward of the motor assembly 202 and cause ejection seat 14 to be expelled from cockpit 18. In various embodiments, ram 206 may separate from the motor assembly 202 in response to seat 14 departing from the cockpit 18 and the first portion of gas may be directed to exhaust through nozzle assembly 300, tending thereby to provide a continuous thrust to further separate the seat 14 from the aircraft 12. In various embodiments, the ram assembly 204 may include an integral gas generator which, in response to activation, may drive the ram 206 outward of the motor assembly 202 and cause ejection seat 14 to be expelled from cockpit 18. In various embodiments, the motor assembly 202 may be ignited in response to ram 206 exiting the motor assembly 202.

Figure 3A:
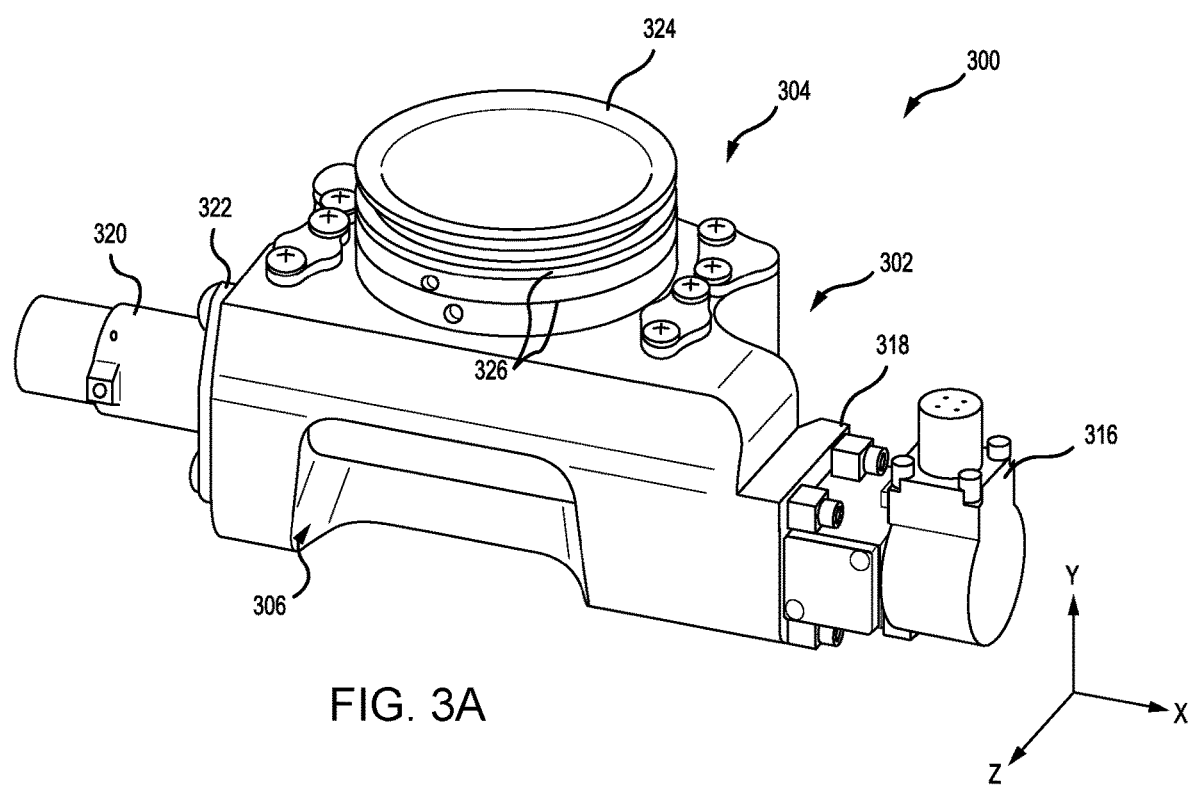
FIG. 3A illustrates a perspective view of a nozzle assembly, in accordance with various embodiments.
Figure 3B:
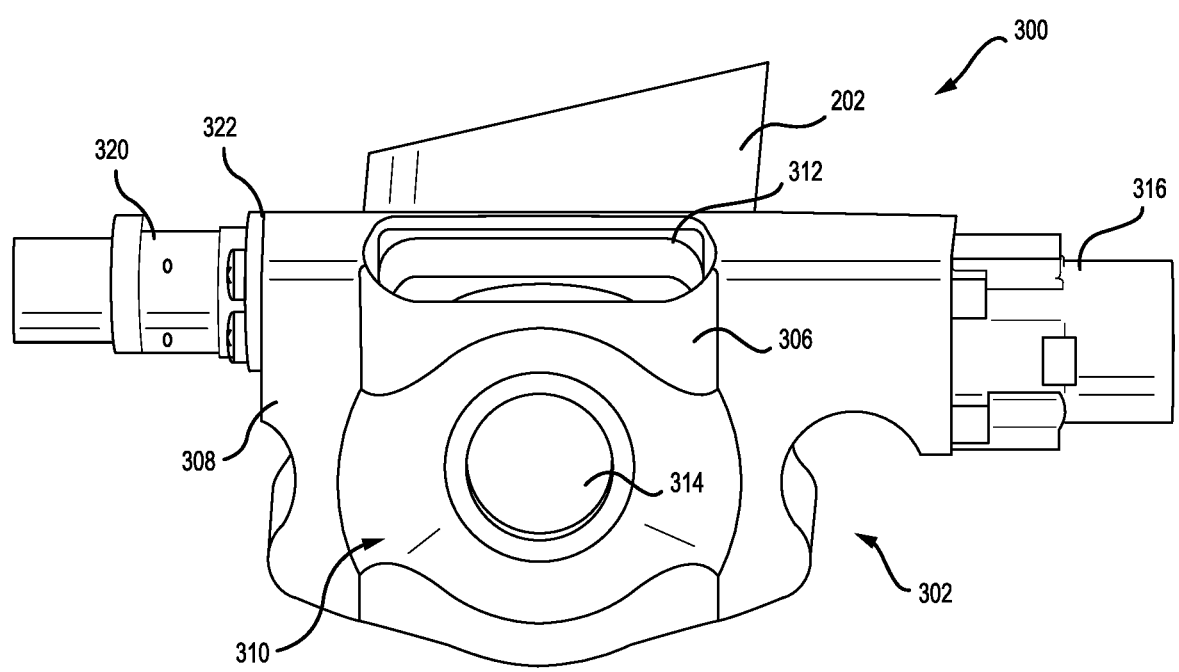
FIG. 3B illustrates a perspective view of a nozzle assembly, in accordance with various embodiments.

In various embodiments and with additional reference to FIGS. 3A and 3B nozzle assembly 300 is illustrated in perspective view. FIG. 3A illustrates nozzle manifold housing 302 of nozzle assembly 300 as viewed from a head end 304 toward exhaust port 306. FIG. 3B illustrates nozzle manifold housing 302 of nozzle assembly 300 as viewed from base 308 toward ram assembly cavity 310 and into the mouth 312 of the rocket nozzle. Ram assembly cavity 310 provides clearance from ram assembly 204 when in the inactive state and extends (along the Y-axis) into ram cylinder 314. Ram cylinder 314 extends axially (along the Y-axis) through the motor assembly 202 and houses the ram 206 when in the inactive state. Nozzle assembly 300 includes a servo valve assembly 316 coupled at a first side 318 of the nozzle manifold housing 302. A rotation sensor assembly 320 is coupled axially (along the X-axis) opposite the servo valve assembly 316 at a second side 322 of the nozzle manifold housing 302.

A motor assembly coupling 324 extends from the head end 304 of the nozzle manifold housing 302. The motor assembly coupling 324 may comprise an annular cylindrical structure which including one or more circumferential channels 326 configured to receive seal members and/or locking rings and the like. In this regard, the motor assembly coupling 324 may be coupled to a case of the motor assembly 202 and direct gas toward the mouth 312. Motor assembly coupling 324 may be monolithic with the nozzle manifold housing 302. In various embodiments, the nozzle manifold housing 302 may comprise a monolithic, additively manufactured structure.

Figure 4:
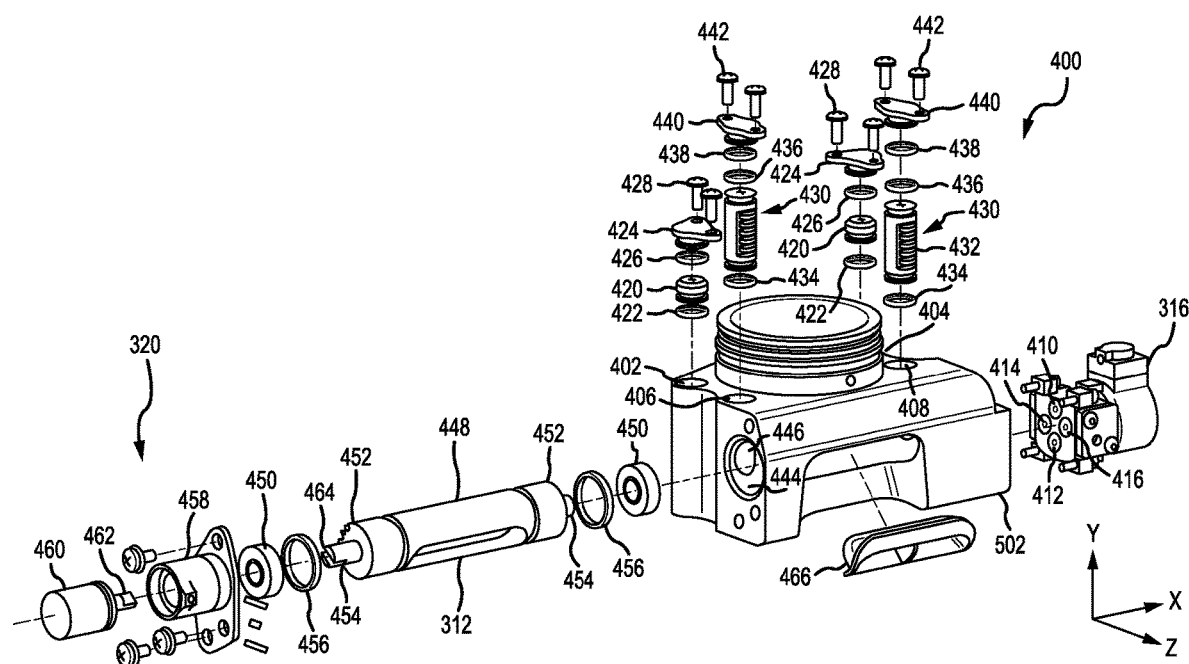
FIG. 4 illustrates an exploded view of a nozzle assembly, in accordance with various embodiments.

In various embodiments and with additional reference to FIG. 4, an exploded view of nozzle assembly 300 is illustrated providing details of components 400 interior to the nozzle manifold housing 302. Nozzle manifold housing 302 includes a first hydraulic reservoir 402 and a second hydraulic reservoir 404. The hydraulic reservoirs (402, 404) are in fluid communication with the servo valve assembly 316 via, respectively, a first input port 410 and a second input port 412. The servo valve assembly 316 may send hydraulic fluid from the reservoirs (402, 404) to a first output port 414 or a second output port 416. In various embodiments, each of the output ports (414, 416) are in fluid communication with a first cylinder 406 and a second cylinder 408. Gas pistons 420 including gas piston seals 422 are inserted into the hydraulic reservoirs (402, 404). Each of the hydraulic reservoirs (402, 404) are closed by a reservoir cover 424 and reservoir cover seal 426. The reservoir covers 424 may be fastened to the head end 304 of the nozzle manifold housing 302 by fasteners 428.

In like regard a rack piston 430 may be inserted into each of the cylinders (406, 408). The rack piston 430 comprises a toothed rack 432 extending axially (Y-axis) along the length of the piston between a base seal 434 and a head end seal 436. A cylinder cover 440 including a cylinder cover seal 438 may close the cylinders (406, 408). The cylinder covers 440 may be fastened to the head end 304 of the nozzle manifold housing 302 by fasteners 442. The toothed rack 432 of the rack pistons 430 may be aligned relatively toward a nozzle cutout 444 extending parallel the X-axis between the servo valve assembly 316 and the rotation sensor assembly 320. The toothed rack 432 of the rack pistons may protrude into the nozzle cutout 444 through rack windows 446 in the respective cylinders (406, 408) which open into the nozzle cutout 444.

A linear nozzle 448 comprises a cylindrical body extending along the X-axis and may be inserted into the nozzle cutout 444. The cylindrical body of the linear nozzle 448 defines a relatively rectangular or oblate opening of the mouth 312. The linear nozzle 448 is coupled to the nozzle manifold housing 302 by bearings 450 and thereby configured to rotate about the X-axis. In various embodiments, the bearings 450 may interface to the linear nozzle 448 at nozzle trunnions 454. In this regard the linear nozzle 448 may direct the first portion of the gas through mouth 312 in a pitch angle about the X-axis defined by the clearance of exhaust port 306. In various embodiments, the linear nozzle 448 may be pitched between ±20° from a neutral position.

The linear nozzle 448 includes pinion teeth 452 (i.e., a pinion tooth set) configured to engage with the toothed rack 432 via the rack window 446. In this regard, a control torque may be supplied to the linear nozzle 448 tending to enable pitch control in response to translating the rack pistons 430 within their respective cylinders (406, 408). In various embodiments, a gear ratio between the toothed rack 432 and the pinion teeth 452 may be 11:17. In various embodiments, the control torque may be about 25 lb-ft (34 N-m) where about in this context means ±10%. The linear nozzle 448 may include exhaust gas seals 456 which may tend to protect bearings 450 from exposure to the first portion of gas. In various embodiments, the rotation sensor assembly 320 comprises a sensor housing 458 and a sensor element 460. Sensor element 460 may include a shaft 462 having a tongue configured to interface with a groove 464 of a nozzle trunnion 454 tending thereby to enable sensor element 460 to determine a rotation of the linear nozzle 448.

In various embodiments, a nozzle seal 466 may be inserted into the mouth 312 of the linear nozzle 448 tending thereby to isolate the interior of the nozzle assembly 300 and motor assembly 202 from environmental damage. The nozzle seal 466 may contact the mouth 312 and/or the exhaust port 306 of the nozzle manifold housing 302 and, in response, generate an interference. In this regard, inserting the nozzle seal 466 into the mouth 312 the linear nozzle 448 may tend to inhibit rotation (i.e., pitching) of the linear nozzle 448 within the nozzle manifold housing 302. In response to activation of the motor assembly 202, the nozzle seal 466 may be ejected from the mouth 312. In this regard, the interference may be removed tending to enable rotation of the linear nozzle 448 within the nozzle manifold housing 302.

Figure 5:
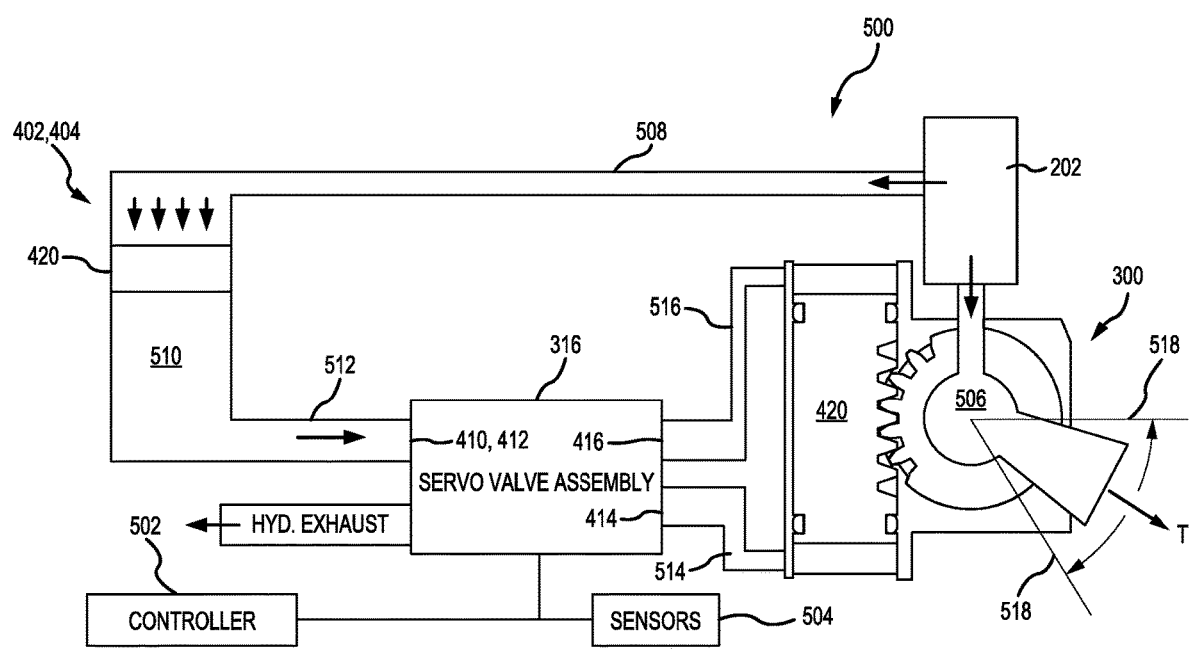
FIG. 5 illustrates a schematic block diagram of a control system for a nozzle assembly, in accordance with various embodiments.

In various embodiments and with additional reference to FIG. 5 a schematic block diagram of a control system 500 for nozzle assembly 300 is illustrated. System 500 includes a controller 502 in electronic communication with sensors 504 and the servo valve assembly 316. In various embodiments, controller 502 may be integrated into computer systems onboard aircraft 12 and/or ejection seat 14. In various embodiments, controller 502 may be configured as a central network element or hub to access various systems, engines, and components of system 500. Controller 502 may comprise a network, computer-based system, and/or software components configured to provide an access point to various systems, engines, and components of system 500. In various embodiments, controller 502 may comprise a processor. In various embodiments, controller 502 may be implemented in a single processor. In various embodiments, controller 502 may be implemented as and may include one or more processors and/or one or more tangible, non-transitory memories and be capable of implementing logic. Each processor can be a general purpose processor, a digital signal processor (DSP), an application specific integrated circuit (ASIC), a field programmable gate array (FPGA) or other programmable logic device, discrete gate or transistor logic, discrete hardware components, or any combination thereof. Controller 502 may comprise a processor configured to implement various logical operations in response to execution of instructions, for example, instructions stored on a non-transitory, tangible, computer-readable medium configured to communicate with controller 502.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

In various embodiments, controller 502 may be in electronic communication with sensors 504 including at least one particulate rotation sensor such as, for example, rotation sensor assembly 320. Sensors 504 may comprise a temperature sensor, a torque sensor, a speed sensor, a pressure sensor, a position sensor, an accelerometer, a mass flow sensor, or any other suitable measuring device known to those skilled in the art. Sensors 504 may be configured to measure a characteristic of an aircraft 10 and/or ejection seat 14 system or component such as catapult assembly 200. Sensors 504 may be configured to transmit measurements to controller 502, thereby providing sensor feedback about the aircraft 12 and ejection seat 14 systems to controller 502. The sensor feedback may be, for example, a speed signal, or may be position feedback, temperature feedback, pressure feedback and/or other data.

In various embodiments, controller 502 may receive an ejection command from the ejection handle 106. In response to the ejection command, the controller may command the rocket catapult assembly to transition from the inactive state to the active state. In response, the motor assembly 202 may send the first portion of gas to the chamber 506 of nozzle assembly 300. The motor assembly 202 may send a second portion of gas to the reservoirs (402, 404). In various embodiments, the motor assembly 202 is in fluid communication with the reservoirs (402, 404) via gas passages 508 internal to the nozzle manifold housing 302. In response to receiving the second portion of the gas, the gas pistons 420 provide an operating pressure to a hydraulic fluid 510 within the reservoirs (402, 404). In various embodiments, the operation pressure may be about 3000 PSI [20684 kPa] where about in this context is ±20%. The hydraulic fluid 510 may flow at the operation pressure through a supply manifold structure 512 integral to the nozzle manifold housing 302 to feed input ports (410, 412) of the servo valve assembly 316. Controller 502 may control the servo valve assembly 316 to send hydraulic fluid 510 at the operating pressure from the first output port 414 to a cylinder lower manifold structure 514 feeding a base end of the cylinders (406, 408) and from the second output port 416 a cylinder upper manifold structure 516 feeding a head end of the cylinders (406, 408). In this regard, the nozzle manifold housing 302 comprises a monolithic body having internal manifold structures integral to the body configured to communicate the gas between the motor assembly 202 and the reservoirs (402, 404) and configured to communicate hydraulic fluid between, the reservoirs (402, 404), the servo valve assembly 316, and the each of the cylinders (406, 408).

In various embodiments and by controlling the flow of hydraulic fluid via the servo valve assembly 316, the controller 502 may control the traverse of the rack pistons 430 within the cylinders (406, 408) thus cause the linear nozzle 448 to pitch between the stops defined by the clearance of exhaust port 306. The controller 502 may receive a pitch rate signal ω from sensors 504 and integrate the pitch rate signal to determine a current pitch angle θ. The controller 502 may receive a first pressure signal from sensors 504 and determine a desired pitch angle c based on the first pressure signal. The controller 502 may receive a second pressure signal from sensors 504 and determine a thrust T based on the second pressure signal. In various embodiments, the controller may determine a pitch moment M to achieve the desired pitch angle c based on a first gain function of the current pitch angle θ and the desired pitch angle ε, and a second gain faction, wherein the second gain function is based on the of the pitch rate signal ω. The controller 502 may calculate a nozzle command angle Ac based on the thrust T and the pitch moment M and command the linear nozzle 448 to rotate to the nozzle command angle Ac. In various embodiments, the controller 502 may recalculate and adjust the nozzle command angle Ac based on a gain function of a nozzle angle signal provided by the rotation sensor assembly 320 and the nozzle command angle Ac. In various embodiments, the controller 502 may recalculate and adjust the nozzle command angle Ac based on a change in the pitch rate signal ω.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A nozzle assembly, comprising:
   a servo valve assembly,
   a reservoir;
   a cylinder;
   a nozzle manifold housing comprising a monolithic body having an internal manifold structure integral to the monolithic body and configured to communicate a gas between a pressure source and the reservoir, and configured to communicate a hydraulic fluid between, the reservoir, the servo valve assembly, and the cylinder, the nozzle manifold housing defining an exhaust port;
   a rack piston disposed within the cylinder and configured to translate axially therein between a base end and a head end of the cylinder; and
   a linear nozzle coupled to the rack piston and configured to rotate in response to an axial translation of the rack piston, wherein the linear nozzle defines a mouth, and wherein rotation of the linear nozzle rotates the mouth relative to the exhaust port.

2. The nozzle assembly of claim 1, wherein the internal manifold structure includes a gas passage between the pressure source and the reservoir, an upper manifold structure, and a lower manifold structure.

3. The nozzle assembly of claim 2, wherein the lower manifold structure is coupled to a first output port of the servo valve assembly and configured to feed the base end of the cylinder, and
   wherein the upper manifold structure is coupled to a second output port of the servo valve assembly and configured to feed the head end of the cylinder.

4. The nozzle assembly of claim 3, wherein the cylinder and the reservoir are integral to the nozzle manifold housing.

5. The nozzle assembly of claim 4, wherein the cylinder comprises a rack window.

6. The nozzle assembly of claim 5, wherein the rack piston comprises a toothed rack disposed in the rack window, wherein the linear nozzle is coupled to the toothed rack at a pinion tooth set.

7. The nozzle assembly of claim 6, wherein a gear ratio between the toothed rack and the pinion tooth set is 11:17.

8. The nozzle assembly of claim 1, wherein the linear nozzle is configured to rotate between ±20° from a neutral position.

9. The nozzle assembly of claim 1, further comprising a tangible, non-transitory memory configured to communicate with a controller, the tangible, non-transitory memory having instructions stored thereon that, in response to execution by the controller, cause the controller to perform operations comprising:
   determining, by the controller, a current pitch angle based on a pitch rate signal;
   determining, by the controller, a desired pitch angle;
   calculating, by the controller, a nozzle command angle based on the desired pitch angle; and
   commanding, by the controller, the linear nozzle to rotate to the nozzle command angle.

10. An ejection seat, comprising:
    a seat pan;
    a seat back coupled to the seat pan; and
    a rocket catapult assembly coupled to the seat back, the rocket catapult including a motor assembly configured to generate a high pressure gas, and a nozzle assembly coupled to the motor assembly and configured to receive the high pressure gas, the nozzle assembly comprising:
    a servo valve assembly,
    a reservoir;
    a cylinder;
    a nozzle manifold housing comprising a monolithic body having an internal manifold structure integral to the monolithic body configured to communicate a first portion of the high pressure gas between the motor assembly and the reservoir, and configured to communicate a hydraulic fluid between, the reservoir, the servo valve assembly, and the cylinder, the nozzle manifold housing defining an exhaust port;
    a rack piston disposed within the cylinder and configured to translate axially therein between a base end and a head end of the cylinder; and
    a linear nozzle coupled to the rack piston and configured to rotate in response to an axial translation of the rack piston wherein the linear nozzle defines a mouth, and wherein the nozzle manifold housing is configured to direct a second portion of the high pressure gas into the mouth, and wherein rotation of the linear nozzle rotates the mouth relative to the exhaust port.

11. The ejection seat of claim 10, wherein the internal manifold structure includes a gas passage between the high pressure gas and the reservoir, an upper manifold structure, and a lower manifold structure.

12. The ejection seat of claim 11, wherein the lower manifold structure is coupled to a first output port of the servo valve assembly and configured to feed the base end of the cylinder, and
    wherein the upper manifold structure is coupled to a second output port of the servo valve assembly and configured to feed the head end of the cylinder.

13. The ejection seat of claim 12, wherein the cylinder and the reservoir are integral to the nozzle manifold housing.

14. The ejection seat of claim 13, wherein the cylinder comprises a rack window.

15. The ejection seat of claim 14, wherein the rack piston comprises a toothed rack disposed in the rack window, wherein the linear nozzle is coupled to the toothed rack at a pinion tooth set.

16. The ejection seat of claim 15, wherein a gear ratio between the toothed rack and the pinion tooth set is 11:17.

17. The ejection seat of claim 10, wherein the linear nozzle is configured to rotate between ±20° from a neutral position.

18. The ejection seat of claim 10, further comprising a tangible, non-transitory memory configured to communicate with a controller, the tangible, non-transitory memory having instructions stored thereon that, in response to execution by the controller, cause the controller to perform operations comprising:
    determining, by the controller, a current pitch angle based on a pitch rate signal;
    determining, by the controller, a desired pitch angle;
    calculating, by the controller, a nozzle command angle based on the desired pitch angle; and
    commanding, by the controller, the linear nozzle to rotate to the nozzle command angle.

19. An article of manufacture including a tangible, non-transitory computer-readable storage medium having instructions stored thereon that, in response to execution by a processor, cause the processor to perform operations comprising:

transitioning, by the processor, a rocket catapult assembly from an inactive to an active state, the rocket catapult assembly including a motor assembly and a nozzle housing, the nozzle housing defining an exhaust port configured to output, at least, a portion of a gas received from the motor assembly;

determining, by the processor, a current pitch angle based on a pitch rate signal;

determining, by the processor, a desired pitch angle based on a first pressure signal;

calculating, by the processor, a nozzle command angle based on the desired pitch angle; and commanding, by the controller, a linear nozzle located within the nozzle housing to rotate to the nozzle command angle, the linear nozzle defining a mouth, wherein the nozzle housing is configured to direct the portion of the gas received from the motor assembly into the mouth, and wherein rotation of the linear nozzle rotates the mouth relative to the exhaust port.

20. The article of manufacture of claim 19, wherein the operations further comprise:

determining, by the processor, a thrust based on a second pressure signal;

calculating, by the processor, a pitch moment based on a first gain function of the current pitch angle, the desired pitch angle, and a second gain function, wherein the second gain function is based on the pitch rate signal; and calculating, by the processor, the nozzle command angle based on the thrust and the pitch moment.

\* \* \* \* \*